(12) United States Patent
Peyerl et al.

(10) Patent No.: US 11,387,917 B2
(45) Date of Patent: Jul. 12, 2022

(54) APPARATUS, SYSTEM AND METHOD FOR WIRELESS SLIP RING DATA TRANSMISSION

(71) Applicant: General Dynamics Land Systems—Canada Corporation, Ottawa (CA)

(72) Inventors: Herb Peyerl, Ottawa (CA); Andrew Hookey, Ottawa (CA); Terry Chepyha, Ottawa (CA)

(73) Assignee: General Dynamics Land Systems—Canada Corporation, Ottawa (CA)

(*) Notice: Subject to any disclaimer, the term of this patent is extended or adjusted under 35 U.S.C. 154(b) by 0 days.

(21) Appl. No.: 17/309,190

(22) PCT Filed: Nov. 4, 2019

(86) PCT No.: PCT/CA2019/051563
§ 371 (c)(1),
(2) Date: May 4, 2021

(87) PCT Pub. No.: WO2020/093145
PCT Pub. Date: May 14, 2020

(65) Prior Publication Data
US 2022/0038188 A1    Feb. 3, 2022

Related U.S. Application Data

(60) Provisional application No. 62/755,966, filed on Nov. 5, 2018.

(51) Int. Cl.
*H01P 1/06*     (2006.01)
*H04B 10/80*    (2013.01)
*H04B 5/00*     (2006.01)

(52) U.S. Cl.
CPC ........... *H04B 10/80* (2013.01); *H04B 5/0031* (2013.01); *H01P 1/06* (2013.01)

(58) Field of Classification Search
None
See application file for complete search history.

(56) References Cited

U.S. PATENT DOCUMENTS

| 5,691,687 A | 11/1997 | Kumagai et al. | |
| 6,556,165 B2 * | 4/2003 | Fukushima | H01Q 3/04 342/75 |

(Continued)

FOREIGN PATENT DOCUMENTS

KR    2011139579 A  * 12/2011

OTHER PUBLICATIONS

Patyuchenko, Anton, 60 GHz Wireless Data Interconnect for Slip Ring Applications, 2019 (Year: 2019).*

(Continued)

*Primary Examiner* — Jai M Lee
(74) *Attorney, Agent, or Firm* — LKGlobal | Lorenz & Kopf, LLP (57) ABSTRACT

A wireless slip ring, system and method for transmission of data across a rotatable junction can be provided to permit transmission of data from a fixed element to a rotating element across a rotary interface. The wireless slip ring can provide high bandwidth multi-channel data transmission, for example each channel can have a bandwidth greater than 1 gigabit per second. Each channel may include a plurality of input/output data streams that can be serialized by a digital electronic circuit for transmission across the slip ring and then deserialized into its respective data streams. The wireless slip ring can form an annular chamber to act as a wave guide for the wireless signal for providing a continuous conductive covering around the annular chamber to act as a (Continued)

faraday shield to contain radio frequency emissions and prevent external jamming.

14 Claims, 5 Drawing Sheets

(56) References Cited

U.S. PATENT DOCUMENTS

| | | | | |
|---|---|---|---|---|
| 7,338,193 | B1* | 3/2008 | Zeiger | G06F 1/1683 |
| | | | | 362/558 |
| 7,899,332 | B2* | 3/2011 | Shindou | H04B 10/801 |
| | | | | 398/116 |
| 8,410,988 | B2* | 4/2013 | Iverson | H01Q 3/02 |
| | | | | 333/135 |
| 8,749,324 | B2* | 6/2014 | Sakurai | H04N 13/31 |
| | | | | 333/256 |
| 10,164,717 | B2* | 12/2018 | Kakimoto | H04B 10/11 |
| 2003/0185338 | A1 | 10/2003 | Dafni et al. | |
| 2005/0279914 | A1 | 12/2005 | Dimsdale et al. | |
| 2010/0289896 | A1* | 11/2010 | Kong | H04N 21/43637 |
| | | | | 348/143 |
| 2014/0254602 | A1 | 9/2014 | Lindorfer | |
| 2021/0021341 | A1* | 1/2021 | Schneider | H04B 10/614 |
| 2021/0278505 | A1* | 9/2021 | Pacala | G01S 17/89 |
| 2021/0391923 | A1* | 12/2021 | Schneider | H04B 10/43 |

OTHER PUBLICATIONS

Peric et al., Cost effective FPGA implementation of high bandwidth communication through slip ring using circular waveguide, 2018 (Year: 2018).*

* cited by examiner

APPARATUS, SYSTEM AND METHOD FOR WIRELESS SLIP RING DATA TRANSMISSION

CROSS-REFERENCE TO RELATED APPLICATIONS

This application is a National Stage of International Application No. PCT/CA2019/051563, filed Nov. 4, 2019, which claims the benefit of U.S. Provisional Application No. 62/755,966, filed on Nov. 5, 2018, the entire disclosure of which are incorporated herein by reference.

TECHNICAL FIELD

The present disclosure is related to the field of slip ring data transmission, in particular, high bandwidth wireless slip ring data transmission.

BACKGROUND

Existing slip rings use brush contacts to transmit power and data across a rotary based junction. While these slip rings can have optical components or capacitive rings to transmit higher bandwidth data, such systems require expensive components and complex circuitry to support data transmission. It is, therefore, desirable to provide a slip ring data transmission apparatus, system and method that overcomes the shortcomings of the prior art.

SUMMARY

This section provides a general summary of the disclosure, and is not a comprehensive disclosure of its full scope or all of its features.

A wireless slip ring, system and method are provided for transmission of data across a rotatable or rotary interface. In some embodiments, the wireless slip ring can provide high-bandwidth, multi-channel data transmission via a wireless signal. For example, in one embodiment each channel may have a bandwidth greater than 1 gigabit per second ("Gbps"). In another embodiment, each channel may have a bandwidth of at least 3.5 Gbps. Each channel can comprise a number of input/output ("I/O") data streams. The I/O data streams of each channel can be serialized by a digital electronic circuit for transmission across the slip ring with one or more wireless transceiver pairs and then deserialized into its respective data streams. The wireless slip ring can form an annular chamber to act as a wave guide for the wireless signal and provide a continuous conductive covering around the annular chamber to act as a faraday shield for containing radio frequency emissions and prevent external jamming.

In some embodiment, the transceiver pairs may include a radio frequency transceiver, an optical transceiver and any other suitable wireless transceiver as well known by those skilled in the art. Each channel may use a separate transceiver pair to ensure security and separation of data for each channel. The serialized data for each channel can be deserialized by a second digital electronic circuit and separated back into its respective I/O data streams.

In some embodiments, the wireless slip ring may include a first or fixed ring that can be attached to a fixed portion of a rotary interface and a second or movable ring that can be attached to a rotary portion of the rotary interface. In some embodiments, the fixed ring and/or the movable rings may include a plurality of partial ring portions that can be assembled. Thus, the slip ring can be included in new installations, or it can be installed on existing slip rings or rotary interfaces to provide high-bandwidth wireless data transmission capability thereto. As described herein, the wireless slip ring may have reduced size, weight and power required to deliver high-bandwidth data transmission across a rotary junction. The mechanical assembly can employ an air-gapped solution that is not reliant on traditional bearings, brushes, or other items for the data path, that require regular maintenance.

Broadly stated, in some embodiments, the wireless slip ring includes a first electrically-conductive ring configured to be affixed to the fixed element and a second electrically-conductive ring configured to be affixed to the rotatable element. A conductive gasket seals an annular chamber at a junction between the first and second rings. One or more wireless transceiver pairs are used to wirelessly transmit a data signal in the waveguide between the fixed and rotatable rings. Each transceiver pair includes a first wireless transceiver mounted to the fixed ring and a second wireless transceiver mounted to the rotatable ring.

In some embodiments, the one or more wireless transceiver pairs includes at least one radio frequency transceiver pair. In some embodiments, the one or more wireless transceiver pairs includes at least one optical transceiver pair. In some embodiments, the one or more transceiver pairs each have a bandwidth greater than 1 gigabit per second. In some embodiments, at least one of the first and second rings includes a plurality of partial ring portions.

Broadly stated, in some embodiments, the system includes a slip ring having a first, electrically conductive ring configured to be affixed to a fixed element and a second, electrically conductive ring configured to be affixed to a rotary element. The first and second rings form an annular chamber therebetween which defines a waveguide. A conductive gasket seals the annular chamber at a junction between the first and second rings such that a continuous conductive covering is formed around the annular chamber for providing a faraday shield for the waveguide. A wireless transceiver pair includes a first wireless transceiver mounted to the first ring and a second wireless transceiver mounted to the second ring for wirelessly transmitting a data signal in the waveguide between the first and second rings. The system also include a first input/output ("I/O") channel configured to send a first output data stream and receive a first input data stream and a first digital electronic circuit coupling the first I/O channel and the first wireless transceiver. The first digital electronic circuit is configured to receive the first output data stream from the first I/O channel, serialize the first output data stream into a first serialized data stream, send the first serialized data stream to the first wireless transceiver, receive a second serialized data stream from the first wireless transceiver, deserialize the second serialized data stream into a second input data stream and send the second input data stream to the first I/O channel. The system also includes a second input/output ("I/O") channel configured to send a second output data stream and receive a second input data stream and a second digital electronic circuit coupling the second I/O channel and the second wireless transceiver. The second digital electronic circuit is configured to receive the second output data stream from the second I/O channel, serialize the second output data stream into a second serialized data stream, send the second serialized data stream to the second wireless transceiver, receive the first serialized data stream from the second wireless transceiver, deserialize the second serialized data stream into the second input data stream and send the second data input stream to the second I/O channel. The wireless transceiver pair is configured to wirelessly transmit the first and second serialized data streams in the waveguide between the first and second rings.

In some embodiments, each of the first and second digital electronic circuits include a field programmable gate array. In some embodiments, at least one of the first output data stream and the second output data stream includes a gigabit ethernet data stream, or a digital video data stream, or a controller area network bus data stream or a combination thereof. In some embodiments, at least one of the first input data stream and the second input data stream includes a gigabit ethernet stream, or a digital video stream, or a controller area network bus stream or a combination thereof. In some embodiments, at least one of the first and second rings includes a plurality of partial ring portions.

Broadly stated, in some embodiments, a method is provided for transmitting data across a slip ring having a first, electrically-conductive ring and a second electrically-conductive ring, wherein the first and second rings form an annular chamber defining a waveguide, and a conductive gasket sealing the annular chamber at junctions between the first ring and the second ring to form a continuous conductive covering around the annular chamber and provide a faraday shield for the waveguide. According to the method, a plurality of first output data streams are received by a first digital electronic circuit from a first input/output channel and serialized into a first serialized data stream by the first digital electronic circuit. The first serialized data stream is sent to a first wireless transceiver mounted to the first ring by the first digital electronic circuit and transmitted as a wireless signal through the waveguide from the first wireless transceiver to a second wireless transceiver. The first serialized data stream is received from the second wireless transceiver by a second digital electronic circuit and deserialized into a plurality of first input data streams by the second digital electronic circuit. The plurality of first input data streams are sent by the second digital electronic circuit to a second input/output channel.

In some embodiments, then method includes receiving a plurality of second output data streams by the second digital electronic circuit from the second input/output ("I/O") channel and serializing the plurality of second output data streams into a second serialized data stream by the second digital electronic circuit. The second serialized data stream is sent to the second wireless transceiver by the second digital electronic circuit and transmitted as a wireless signal through the waveguide from the second wireless transceiver to the first wireless transceiver. The second serialized data stream is received from the first wireless transceiver by the first digital electronic circuit and deserialized into a plurality of second input data streams by the first digital electronic circuit. The plurality of second input data streams by the first digital electronic circuit to the first input/output ("I/O") channel.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Figure 1:
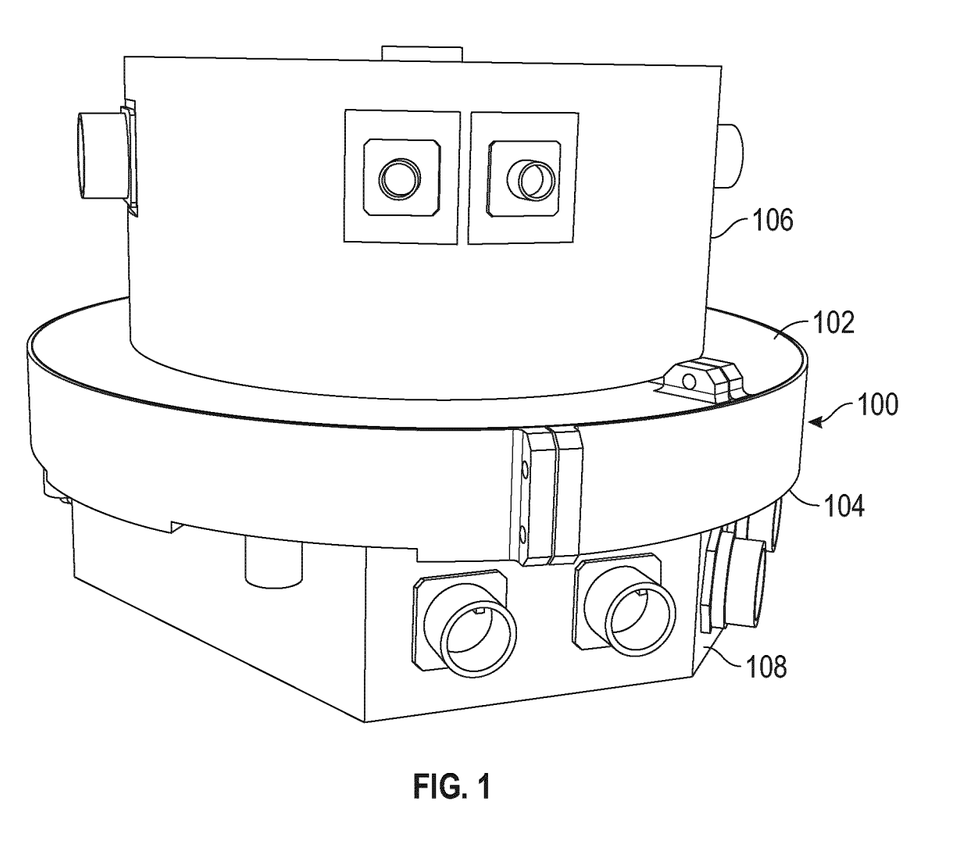
FIG. 1 is a perspective view depicting an embodiment of a wireless slip ring installed between a fixed element and a rotatable element.

Referring to FIG. 1, a slip ring 100 is provided for transmitting data across a rotating interface between a fixed element 106 such as a hull or support base and a rotatable element 108 such as a turret. The slip ring 100 can comprise a fixed ring 102 and a rotatable ring 104. In some embodiments, the slip ring 100 can be designed to be installed prior to mounting the rotatable element 108 to the fixed element 106. In such embodiments, the fixed ring 102 and/or the rotatable ring 104 can each be formed as a single ring. The term "ring" as used herein refers to an annular structure which circumscribes the fixed or rotatable elements. The annular structure may be any given shape and should not be limited to a circular configuration.

Figure 2:
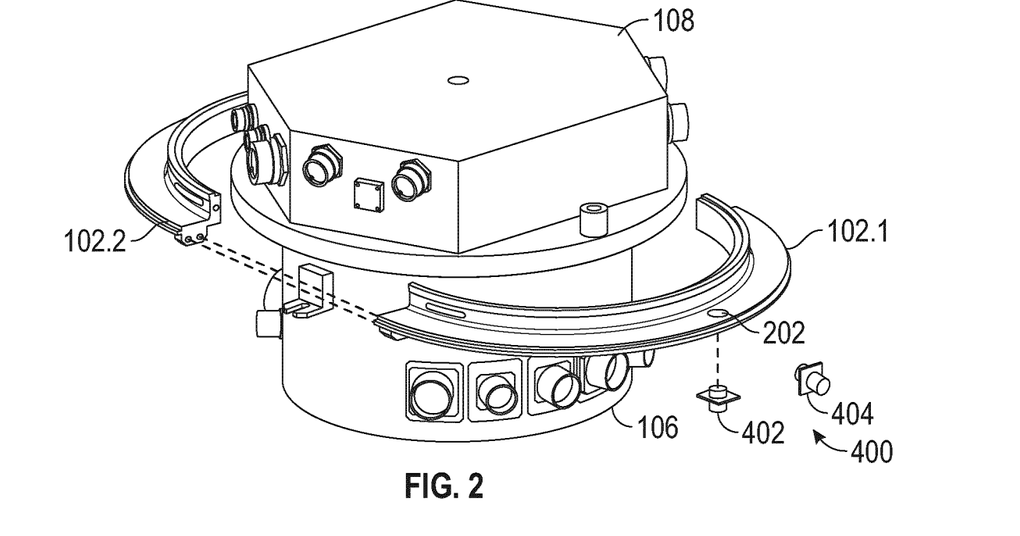
FIG. 2 is an expanded perspective view depicting the installation of a first ring of the slip ring on the fixed element.
Figure 3:
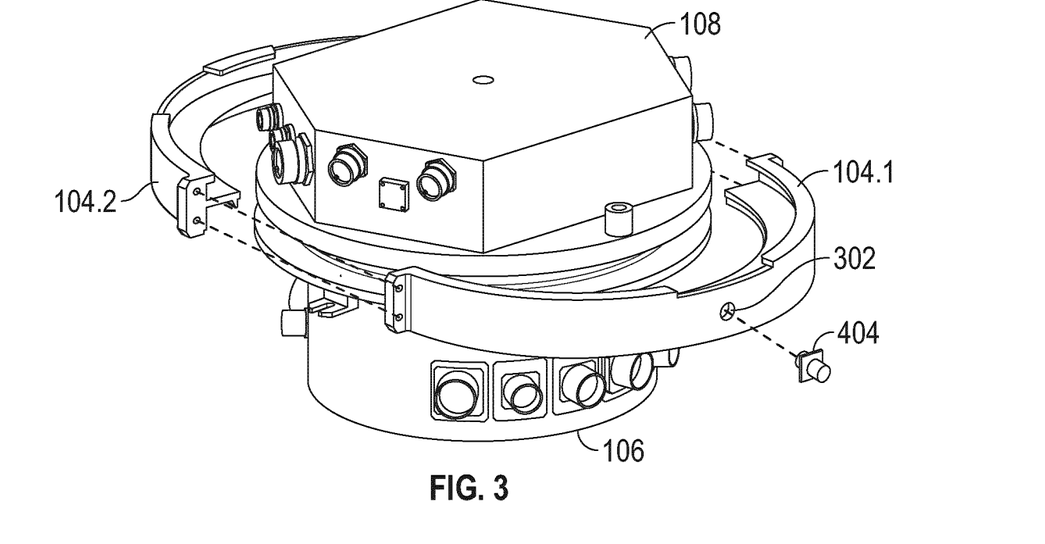
FIG. 3 is an expanded perspective view depicting the installation of a second ring of the slip ring on the rotatable element.
Figure 4:
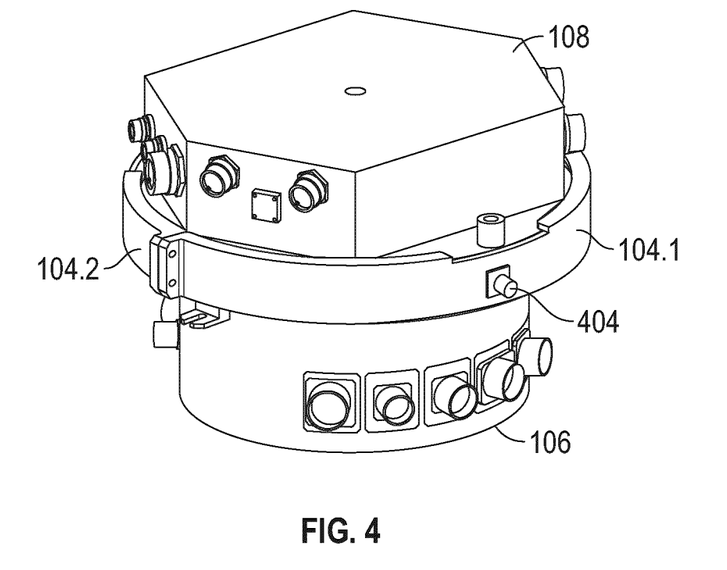
FIG. 4 is a perspective view depicting the installation of the wireless transceivers to the slip ring of FIG. 1.

In other embodiments, the slip ring 100 can be used in conjunction with an existing slip ring to provide a high-speed wireless communication link between the fixed element 106 and the rotatable element 108. FIGS. 2-4 illustrate the process of installing slip ring 100 without dismounting the rotatable element 108 from the fixed element 106.

Referring to FIG. 2, the fixed ring 102 can comprise two fixed partial ring sections 102.1, 102.2, which can be placed around the fixed element 106 to form fixed ring 102. Likewise, as shown in FIG. 3, the rotatable ring 104 can comprise two rotatable partial ring section 104.1, 104.2, which can be placed around the rotatable element 108 to form the rotatable ring 104. In some embodiments, one or both the fixed ring 102 and the rotatable ring 104 can comprise a plurality of partial ring sections to facilitate the installation thereof on fixed element 106 and rotatable element 108, respectively, of a rotary interface. Thus, in these embodiments, slip ring 100 can be installed on a rotary interface as a "retro-fit" system, as well as being installed on a rotary junction when it is being manufactured.

As shown in FIG. 2, the fixed ring 102 can comprise a fixed ring opening 202. A first or fixed ring wireless transceiver 402 (FIG. 4) can be mounted into the opening 202 on the fixed ring 102. In some embodiments, the fixed ring 102 may have a plurality of openings formed therein with separate first wireless transceivers 402.1, 402.2 (FIG. 8) mounted in each of these openings.

As shown in FIG. 3, the rotatable ring 104 can comprise a rotatable ring opening 302. A second or rotatable ring wireless transceiver 404 (FIG. 4) can be mounted into the opening 302 in the rotatable ring 104. In some embodiments, the rotatable ring 104 may include a plurality of openings formed therein with separate second wireless transceivers 404.1, 404.2 (FIG. 8) mounted in each of these openings.

Figure 8:
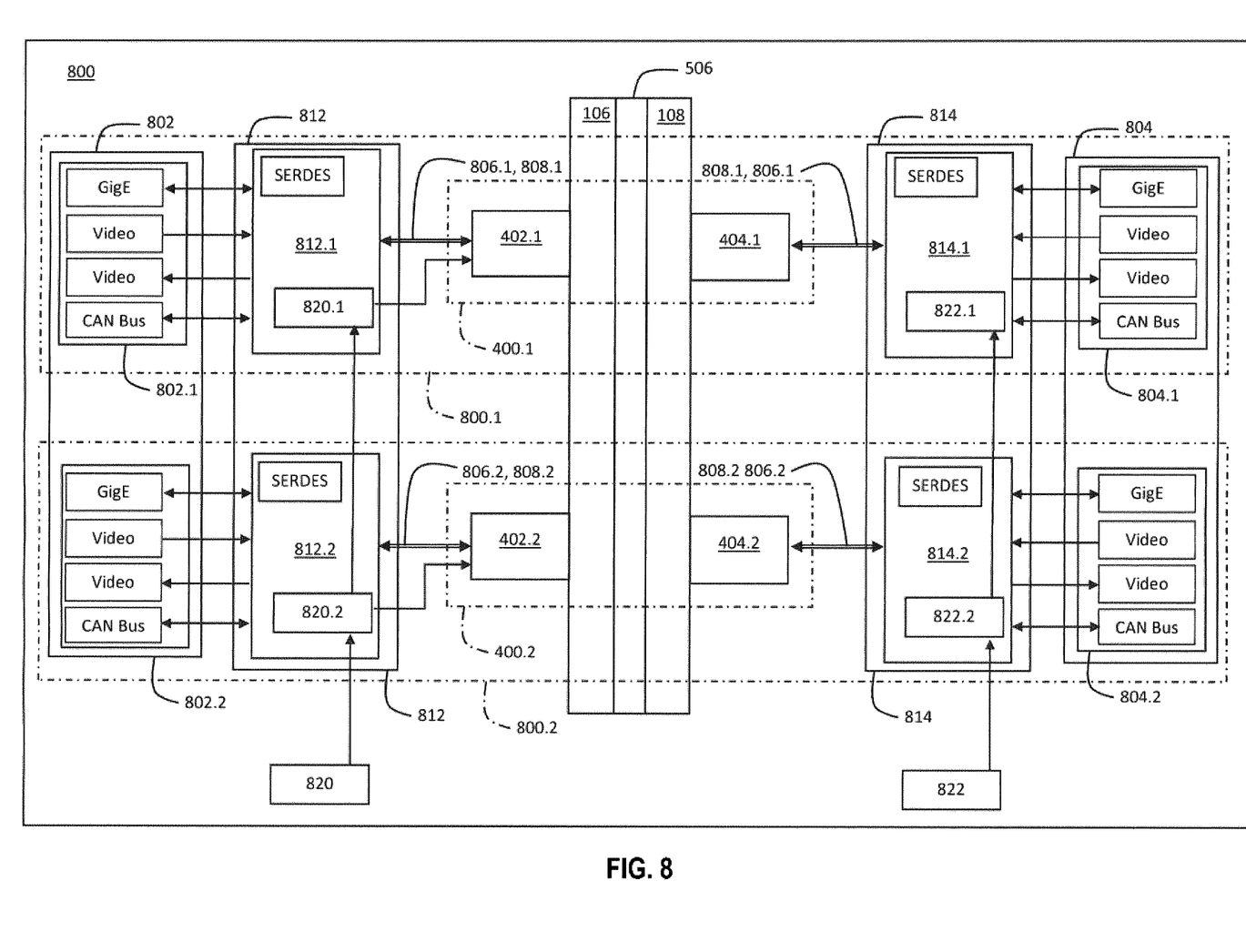
FIG. 8 is a block diagram depicting one embodiment of a wireless slip ring system.

Each set of first and second wireless transceivers 402.1/404.1, 402.2/404.2 forms a wireless transceiver pair 400.1, 400.2 (collectively 400) providing a discrete channel for wireless data transmission across an annular channel 506 between the fixed and rotatable rings 102, 104. One skilled in the art should recognize that an embodiment with multiple wireless transceiver pairs 400.1, 400.2 provides multiple channels of communication, thereby increasing the bandwidth across the slip ring. For example, in one embodiment each channel may have a bandwidth greater than 1 gigabit per second ("Gbps"). In another embodiment, each channel may have a bandwidth of at least 3.5 Gbps. In some embodiments, a wireless transceiver pair 400 may include radio frequency transceivers and each channel can use transceiver pairs of a different frequency. By way of example, one transceiver pair 400.1 may transmit and receive at a frequency of 60 gigahertz ("GHz"), while a second transceiver pair 400.2 may transmit and receive at a frequency of 75 GHz. In some embodiments, the transceiver pairs 400 may include optical transceivers, such as an LED-based transceiver pairs. Other wireless transceiver pairs 400 as known to one skilled in the art may also be used.

Figure 5:
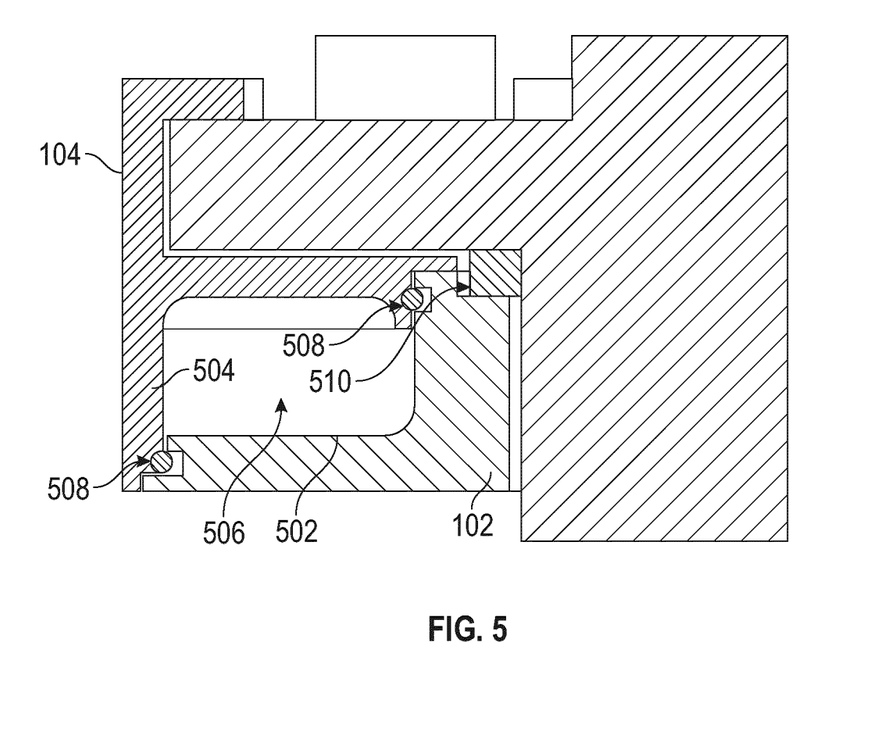
FIG. 5 is a partial cross-section elevation view depicting conductive gaskets disposed in the slip ring of FIG. 4.

Referring to FIG. 5, the fixed ring 102 can comprise a fixed ring inner surface 502 and the rotatable ring 104 can comprise a rotatable ring inner surface 504. The fixed ring 102 and the rotatable ring 104 can be configured such that fixed ring inner surface 502 and rotatable ring inner surface 504 form an annular channel or chamber 506 which may act as a waveguide for wireless data transmission between the wireless transceivers pairs 400. The fixed ring 102 and the rotatable ring 104 can be made of a conductive material, such as aluminum. The junctions between fixed ring 102 and rotatable ring 104 can be sealed by conductive gaskets 508, 510. The sealing of the junctions with conductive gaskets 508, 510 can provide continuous conductive material around annular chamber 506 to form a faraday shield for preventing unwanted emanations of wireless signals and preventing the wireless signal from being intentionally jammed by an outside interference source.

Figure 6:
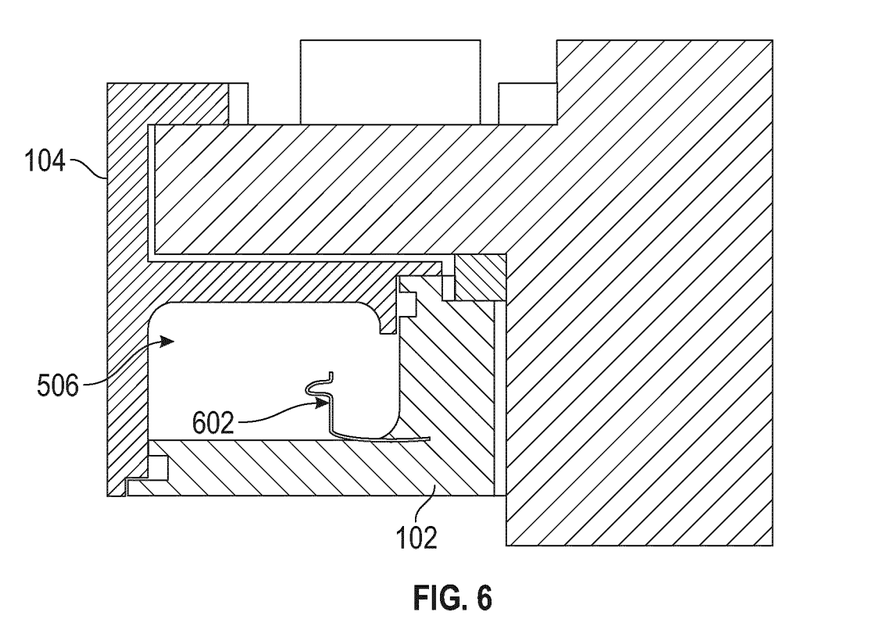
FIG. 6 is a partial cross-section elevation view depicting a grounding wire disposed in the slip ring of FIG. 4.
Figure 7:
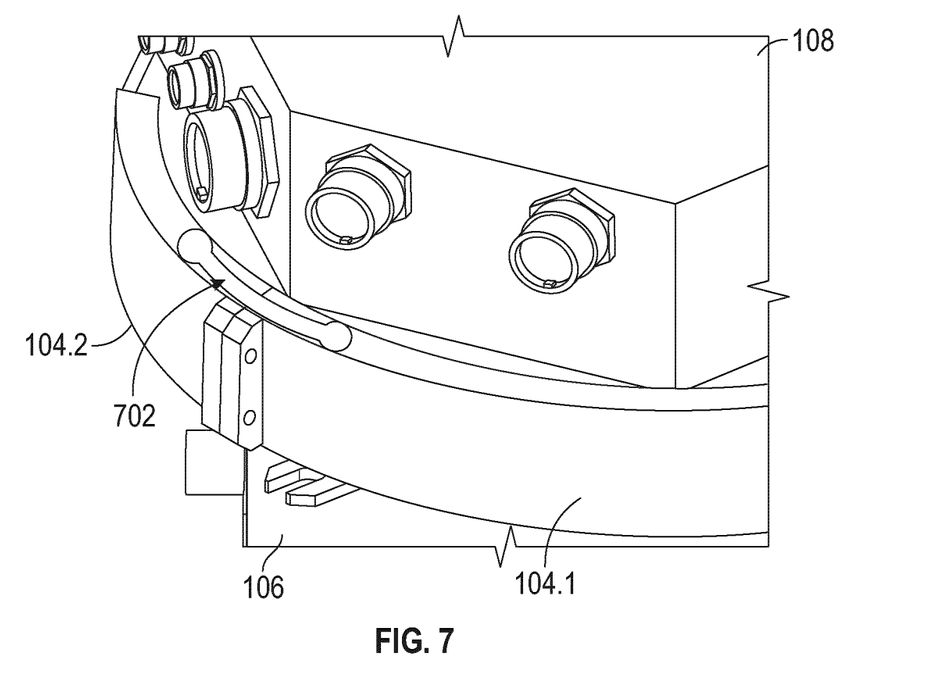
FIG. 7 is a partial perspective view depicting a grounding strap between rotatable ring elements of the slip ring of FIG. 4.

Referring to FIG. 6, the fixed ring 102 can provide a grounding connection with the rotatable ring 104. This can be accomplished by providing a grounding wire 602 embedded into the fixed ring 102 and protruding into the annular chamber 506. The grounding wire 602 can be configured to contact the inner surface 504 of the rotatable ring 104. Referring to FIG. 7, where the rotatable ring 104 comprises two or more rotatable ring elements 104.1, 104.2, a grounding strap 702 can provide a grounding connection between rotatable ring elements 104.1, 104.2.

FIG. 8 depicts a functional block diagram of the wireless slip ring system 800 having a first, classified data transmission channel 800.1 and a second, unclassified data transmission channel 800.2 representing a complete dual-security domain solution. In this way, the wireless slip ring system 800 allows for the transmission of data related to a plurality of different input/output (I/O) channels between the fixed element 106 and the rotatable element 108 across the slip ring 100. The wireless slip ring system 800 can comprise a plurality of first I/O channels 802.1, 802.2 (collectively 802) associated with the fixed element 106 and a plurality of second I/O channels 804.1, 804.2 (collectively 804) associated with the rotatable element 108. The first I/O channels 802 and the second I/O channels 804 can comprise any type of digital data communication, for example the I/O channels may be configured for communicating a high bandwidth gigabit Ethernet ("GigE") data stream, a standard or high definition digital video data stream, a controller area network bus ("CAN Bus") data stream, or a combination thereof.

The wireless slip ring system 800 can comprise a plurality of first digital electronic circuits 812.1, 812.2 (collectively 812) in data communication with the corresponding first I/O channels 802.1, 802.2. In particular, the first I/O channels 802.1, 802.2 communicate first output data (i.e., output data from the fixed element side of the system) to the corresponding first digital electronic circuits 812.1, 812.2. The first output data are serialized by the first digital electronic circuits 812.1, 812.2 into corresponding first serialized data streams 806.1, 806.2, which is communicated to the corresponding first wireless transceivers 402.1, 402.2. The first wireless transceivers 402.1, 402.2 wirelessly transmit the corresponding first serialized data streams 806.1, 806.2 through a waveguide (i.e., annular chamber 506). The first serialized data streams 806.1, 806.2 are received by the corresponding second wireless transceivers 404.1, 404.2 and communicated to the corresponding second digital electronic circuits 814.1, 814.2 (collectively 814). The first serialized data streams 806.1, 806.2 are deserialized by the corresponding second digital electronic circuit 814.1, 814.2 into first input data (i.e., input data to the rotary element side of the system) that is communicated to the corresponding second I/O channels 804.1, 804.2 associated with the rotatable element 108.

A similar but reverse procedure can be followed for transmitting a data stream from the second I/O channels 804 to the corresponding first I/O channels 802. In this case, second output data (i.e., output data from the rotary element side of the system) is communicated from the second I/O channels 804.1, 804.2 to the corresponding second digital electronic circuits 814.1, 814.2 and serialized into corresponding second serialized data streams 808.1, 808.2. The second serialized data streams 808.1, 808.2 are communicated to the corresponding second wireless transceivers 404.1, 404.2 and wirelessly transmitted through the waveguide (i.e., annular chamber 506). The second serialized data streams 808.1, 808.2 are received by the corresponding first wireless transceivers 402.1, 402.2 and communicated to the first digital electronic circuits 812.1, 812.2. The second serialized data stream 808.1, 808.2 can be deserialized by the corresponding first digital electronic circuits 812.1, 812.2 into second input data (i.e., input data to the fixed element side of the system) and communicated to the corresponding first I/O channels 802.1, 802.2.

As describe above, the architecture of the wireless slip ring system 800 provides a plurality of data channels, wherein data communicated on one data channel 801.1 is kept separate from data communicated on another data channel 800.2. For example, the first data channel 800.1 may provide classified data communication and the second data channel 800.2 may provide unclassified data communication. In particular, each data channel uses a separate set of I/O channels, digital electronic circuits for serialization and deserialization and transceiver pairs to communicate data between the fixed and rotatable element 106, 108 across the slip ring 100.

In some embodiments, the transceiver pairs can be radio frequency transceivers and each channel can use transceiver pairs of a different frequency. Each transceiver pair can have a bandwidth greater than 1 gigabit per second and may have a bandwidth of at least 3.5 gigabits per second. Additional channels can also be included to provide increased bandwidth or fault tolerant redundant channels.

The digital electronic circuits 812, 814 described herein can comprise a Field Programmable Gate Array ("FPGA"), a processor, an Application Specific Integrated Circuit ("ASIC"), or other suitable digital electronic circuit as is known to one skilled in the art. In one embodiment, the digital electronic circuits include classified serializer/deserializer devices (SERDES) 812.1, 814.1 and unclassified serializer/deserializer devices (SERDES) 812.2, 814.2.

The first digital electronic circuits 812.1, 812.2 and the first wireless transceivers 402.1, 402.2 can be powered by a common power input 820 via power supply circuits 820.1, 820.2 on the fixed element side of the slip ring 100. Likewise, the second digital electronic circuits 814.1, 814.2 and the second wireless transceivers 404.1, 404.2 can be powered by a common power input 822 via power supply circuits 822.1, 822.2 on the rotatable side of the slip ring 100.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

What is claimed is:

1. A wireless slip ring for transmitting data across a rotary interface between a fixed element and a rotatable element, the slip ring comprising:
    a first electrically-conductive ring configured to be affixed to the fixed element;
    a second electrically-conductive ring configured to be affixed to the rotatable element, wherein the first and second rings form an annular chamber therebetween which defines a waveguide;
    a conductive gasket sealing the annular chamber at a junction between the first and second rings such that a continuous conductive covering is formed around the annular chamber for providing a faraday shield for the waveguide; and
    one or more wireless transceiver pairs, each transceiver pair including a first wireless transceiver mounted to the fixed ring and a second wireless transceiver mounted to the rotatable ring for wirelessly transmitting a data signal in the waveguide between the fixed and rotatable rings.

2. The wireless slip ring according to claim 1, wherein at least one of wireless transceiver pairs comprises a radio frequency transceiver pair.

3. The wireless slip ring according to claim 1, wherein at least one wireless transceiver pairs comprises an optical transceiver pair.

4. The wireless slip ring according to claim 1, wherein each of one or more wireless transceiver pairs has a bandwidth greater than 1 gigabit per second.

5. The wireless slip ring according to claim 1, wherein the first ring comprises a plurality of partial ring portions.

6. The wireless slip ring according to claim 1, wherein the second ring comprises a plurality of partial ring portions.

7. A system for transmitting data across a rotary interface between a fixed element and a rotatable element, the system comprising:
    a slip ring including a first, electrically conductive ring configured to be affixed to the fixed element and a second, electrically conductive ring configured to be affixed to the rotatable element, wherein the first and second rings form an annular chamber therebetween which defines a waveguide;
    a conductive gasket sealing the annular chamber at a junction between the first and second rings such that a continuous conductive covering is formed around the annular chamber for providing a faraday shield for the waveguide;
    a wireless transceiver pair including a first wireless transceiver mounted to the first ring and a second wireless transceiver mounted to the second ring for wirelessly transmitting a data signal in the waveguide between the first and second rings;
    a first I/O channel configured to send a first output data stream and receive a first input data stream;
    a first digital electronic circuit coupling the first I/O channel and the first wireless transceiver, wherein the first digital electronic circuit is configured to receive the first output data stream from the first I/O channel, serialize the first output data stream into a first serialized data stream, send the first serialized data stream to the first wireless transceiver, receive a second serialized data stream from the first wireless transceiver, deserialize the second serialized data stream into a second input data stream and send the second input data stream to the first I/O channel;
    a second I/O channel configured to send a second output data stream and receive a second input data stream; and
    a second digital electronic circuit coupling the second I/O channel and the second wireless transceiver wherein the second digital electronic circuit is configured to receive the second output data stream from the second I/O channel, serialize the second output data stream into the second serialized data stream send the second serialized data stream to the second wireless transceiver, receive the first serialized data stream from the second wireless transceiver, deserialize the second serialized data stream into the second input data stream and send the second data input stream to the second I/O channel;
    wherein the wireless transceiver pair is configured to wirelessly transmit the first and second serialized data streams in the waveguide between the first and second rings.

8. The system according to claim 7 wherein each of the first and second digital electronic circuits each comprises a field programmable gate array.

9. The system according to claim 7, wherein at least one of the first output data stream or the second output data stream comprises a gigabit ethernet data stream, or a digital video data stream, or a controller area network bus data stream or a combination thereof.

10. The system according to claim 7, wherein at least one of the first input data stream or the second input data stream comprises a gigabit ethernet stream, or a digital video stream, or a controller area network bus stream or a combination thereof.

11. The system according to claim 7, wherein the first ring comprises a plurality of partial ring portions.

12. The system according to claim 7, wherein the second ring comprises a plurality of partial ring portions.

13. A method for transmitting data across a slip ring having a first, electrically-conductive ring and a second electrically-conductive ring, wherein the first and second rings form an annular chamber defining a waveguide, and a conductive gasket sealing the annular chamber at junctions between the first ring and the second ring to form a continuous conductive covering around the annular chamber for providing a faraday shield for the waveguide, the method comprising:

receiving a plurality of first output data streams by a first digital electronic circuit from a first I/O channel;

serializing the plurality of first output data streams into a first serialized data stream by the first digital electronic circuit;

sending the first serialized data stream to a first wireless transceiver mounted to the first ring by the first digital electronic circuit;

transmitting the first serialized data stream as a wireless signal through the waveguide from the first wireless transceiver to a second wireless transceiver;

receiving the first serialized data stream from the second wireless transceiver by a second digital electronic circuit;

deserializing the first serialized data stream into a plurality of first input data streams by the second digital electronic circuit; and sending the plurality of first input data streams by the second digital electronic circuit to a second I/O channel.

14. The method according to claim 13, further comprising:

receiving a plurality of second output data streams by the second digital electronic circuit from the second I/O channel;

serializing the plurality of second output data streams into a second serialized data stream by the second digital electronic circuit;

sending the second serialized data stream to the second wireless transceiver by the second digital electronic circuit;

transmitting the second serialized data stream as a wireless signal through the waveguide from the second wireless transceiver to the first wireless transceiver;

receiving the second serialized data stream from the first wireless transceiver by the first digital electronic circuit;

deserializing the second serialized data stream into a plurality of second input data streams by the first digital electronic circuit; and sending the plurality of second input data streams by the first digital electronic circuit to the first I/O channel.

\* \* \* \* \*